United States Patent
Lam et al.

(10) Patent No.: US 7,156,347 B2
(45) Date of Patent: Jan. 2, 2007

(54) PIVOTABLE PYLON FOR EXTERNAL CARRIAGE OF AIRCRAFT STORES

(75) Inventors: Tristin T. Lam, Cypress, CA (US); Edward J. Eng, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 188 days.

(21) Appl. No.: 10/966,544

(22) Filed: Oct. 15, 2004

(65) Prior Publication Data
US 2006/0081733 A1 Apr. 20, 2006

(51) Int. Cl.
*B64D 1/12* (2006.01)

(52) U.S. Cl. ................ 244/137.4; 244/137.1; 89/1.54

(58) Field of Classification Search ........... 244/118.1, 244/129.4, 136, 137.1, 137.4, 129.5; 89/1.53, 89/1.54, 1.55, 1.57
See application file for complete search history.

(56) References Cited

U.S. PATENT DOCUMENTS 4,802,641 A * 2/1989 Hardy et al. ............. 244/137.4
5,257,758 A * 11/1993 Hassel ...................... 244/137.4
6,688,209 B1 * 2/2004 McMahon et al. ........... 89/1.59

* cited by examiner

Primary Examiner—Timothy D. Collins
(74) Attorney, Agent, or Firm—Don C. Lawrence; MacPherson Kwok Chen & Heid LLP

(57) ABSTRACT

A pivotable pylon for carrying stores, such as ordinance, sensors and pods external to an aircraft includes an elongated strongback coupled against an external surface of the aircraft and generally parallel to the longitudinal axis thereof. An elongated pivoting structure is pivotally coupled to the strongback for parallel pivotal movement relative thereto. A locking mechanism locks the pivoting structure in a selected one of a plurality of angular positions relative to the strongback. At least one stores rack is coupled to the pivoting structure for receiving and coupling at least one stores item to the pivoting structure. An aerodynamic fairing may be disposed on the pylon to decrease drag. The pylon can be mounted on either side of the aircraft and in any one of a plurality of longitudinal stations, and enables the aircraft to carry stores that are too large for its equipment bays, and to carry an optimal load of stores.

12 Claims, 4 Drawing Sheets

PIVOTABLE PYLON FOR EXTERNAL CARRIAGE OF AIRCRAFT STORES

TECHNICAL FIELD

This invention generally relates to apparatus for carrying stores, such as weapons, fuel, sensors and the like, on an external surface of an aircraft. More particularly, this invention relates to a pivotable pylon that enables the aircraft to carry stores that are too large for its equipment bays, and to carry an optimum number of external stores.

BACKGROUND

The carriage of stores, such as ordinance, fuel, sensor and camera pods and the like, on an external surface of an aircraft is well known in the aviation industry, and is typically effected through the use of surface-mounted, cantilevered "pylons" that couple to the aircraft's structure, and to which the stores are then attached, either fixedly or releasably. The use of streamlined fairings extending between the skin of the aircraft and the stores to reduce parasitic drag of the pylon during flight is also known.

In modern, high-performance military aircraft, e.g., those with smoothly changing shapes, such as the so-called "Blended-Wing-Body" ("BWB") family of aircraft, the space on the underside of the aircraft's fuselage between its equipment bays and its engine nacelles is relatively narrow, thereby limiting the space available for the external carriage of stores. For example, in the case of the Boeing B-1B bomber, all pylon stations have a common electromechanical interface configuration. As is typical, the aircraft "moldline" at the left side pylon stations is a mirror image of the moldline at the right side pylon stations. However, a common pylon configuration used at all front-to-rear stations on each side of the aircraft does not produce an optimal weapons loadout due to the variety of clearance constraints imposed between the loaded pylons and the doors of the equipment bays and/or the engine nacelles. Depending on the pylon locations and the types of stores carried internally and externally, the pylons may need to be oriented vertically, or alternatively, to be canted outboard somewhat, to provide for an optimal external stores loadout. Additionally, uploading internal stores into or releasing them from the aircraft's bays typically requires that the bay doors be opened fully, which precludes the presence of conventional, vertically oriented pylons adjacent to the doors.

Accordingly, a need exists for a "universal" pylon that is capable of attaching at any station on either side of an aircraft like the B-1B, and that is also compatible with a wide variety of internal/external stores and the associated clearance constraints unique to each pylon station.

BRIEF SUMMARY

In accordance with one or more embodiments of the present invention, a universal, pivotable pylon is provided for the external carriage of aircraft stores, which is usable at any station on either side of the aircraft, and which is compatible with a wide variety of internal and external stores and the associated clearance constraints unique to each pylon station of the aircraft. The pylon enables the aircraft to carry an optimum number of stores externally of the aircraft.

In accordance with an exemplary embodiment thereof, the novel pivotable pylon comprises an elongated strongback having fasteners disposed on a first surface thereof for coupling the strongback to the pylon mounting hardpoints of an aircraft such that the first surface is held generally flush against an external surface of the aircraft, and the strongback is disposed generally parallel to the aircraft's longitudinal axis, or direction of flight. In one possible embodiment, the fasteners of the strongback comprise a conventional pylon suspension fitting and a pylon suspension post that are longitudinally spaced by a standard distance, and which are interchangeable with each other on the strongback. The strongback may be asymmetrical with respect to a sagital plane extending through it to accommodate a bilaterally symmetrical aircraft shape, and still be mountable on either side of the aircraft, in any one of a plurality of longitudinal positions thereon.

An elongated pivoting structure is pivotally coupled to the strongback for parallel angular movement relative to the longitudinal axis of the strongback. In one possible embodiment, the pivoting structure may be pivotally coupled to the strongback by a pair of pivot pins, each disposed at an opposite end of the pivoting structure and rotatably engaged in a corresponding pivot bearing at a corresponding end of the strongback. At least one stores ejector rack, such as a multiple ejector rack ("MER"), is coupled to the pivoting structure for receiving and releasably coupling one or more stores items, such as a weapon or a sensor, to the pivoting structure. The stores ejector rack may include conventional fasteners that are adapted to engage in corresponding sockets in the pivoting structure, and the ejector rack may be of a type that is capable of releasing, or ejecting, the stores item from the pylon during flight. Advantageously, both the pivoting structure and the stores rack may each be symmetrical with respect to a sagital plane respectively extending longitudinally therethrough.

A locking mechanism, such as locking pins, is provided for locking the pivoting structure in a selected one of a plurality of angular pivot positions relative to the strongback, thereby enabling the angular position of the stores items to adjusted relative to the exterior surface of the aircraft, and thereby provide the necessary clearance between the stores and adjacent aircraft structures, such as the doors of a weapons bay, for each unique pylon mounting station thereon. In a high-performance aircraft, an aerodynamic fairing that extends generally between the external surface of the aircraft and an external surface of the at least one stores item may be disposed on the pylon to limit its parasitic drag.

A better understanding of the above and many other features and advantages of the pivotable pylon of the present invention may be obtained from consideration of the detailed description thereof below, particularity if such consideration is made in conjunction with the appended drawings, in which like reference numerals are used to identify like elements illustrated in one or more of the figures.

DETAILED DESCRIPTION

Figure 1:
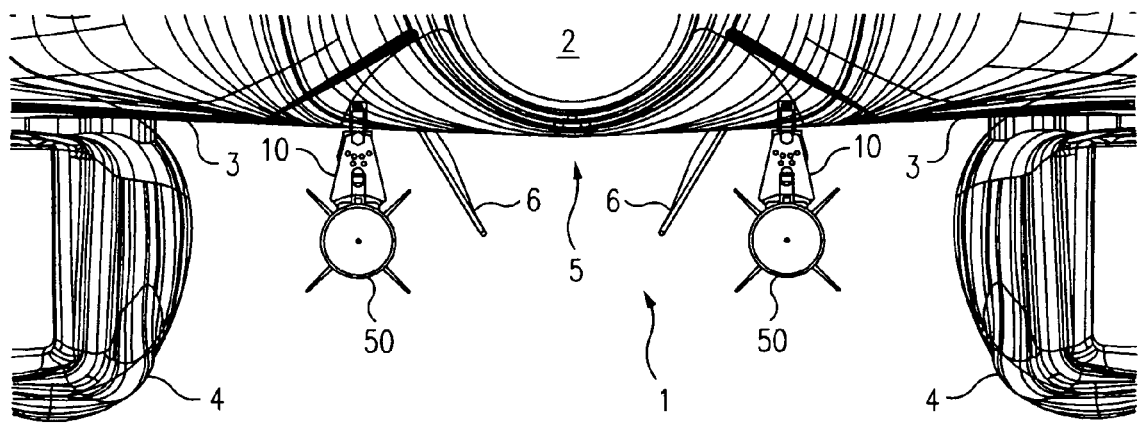
FIG. 1 is partial front elevation view of an aircraft incorporating a pair of pivotable pylons in accordance with an exemplary embodiment of the present invention, showing the pylons disposed at an angular position generally perpendicular to the lower surface of the aircraft.

A partial front elevation view of a high-performance military aircraft 1, e.g., a Boeing B-1B bomber, incorporating a pair of pivotable pylons 10 in accordance with an exemplary embodiment of the present invention is illustrated in FIG. 1. The aircraft comprises an elongated fuselage 2 and a pair of wings 3, each having one or more engine nacelles 4 depending therefrom generally outboard of the fuselage. The wings have extended roots that blend smoothly into the fuselage, giving rise to the descriptive term, "blended-wing-body" ("BWB") design. Such aircraft are typically provided with one or more longitudinally distributed equipment or weapons bays 5, each having a pair of bay doors 6 that swing open from a fully closed position flush with the fuselage (not illustrated), to a half opened position, as illustrated in FIG. 1, for the discharge of certain types of ordinance not requiring fully opened bay doors, e.g., 2000 lb. bombs, to a fully opened position (see FIG. 2), for the uploading or discharge of certain stores into or from the bay that require fully opened bay doors, e.g., 500 lb. bombs.

Figure 2:
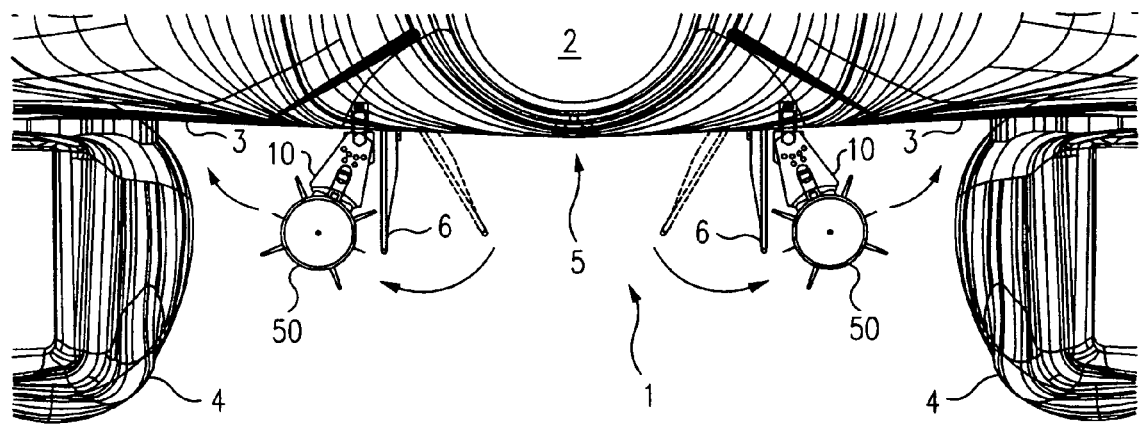
FIG. 2 is partial elevation view of the aircraft of FIG. 1, showing the pylons pivoted outboard to provide clearance between adjacent, fully open equipment bay doors.
Figure 3A:
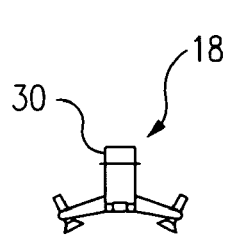
FIGS. 3A–3F are front elevation views of various types of exemplary aircraft stores ejector racks that are useable with the pivotable pylon of the present invention.
Figure 3B:
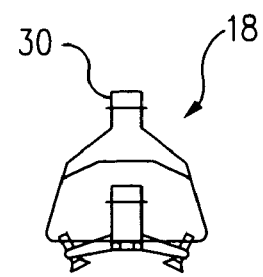
Figure 3C:
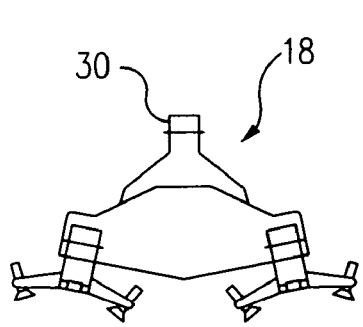
Figure 3D:
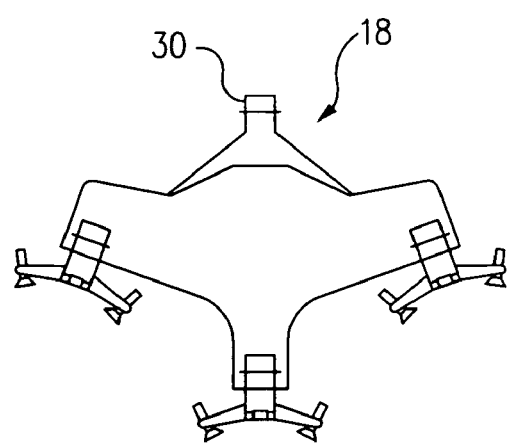
Figure 3E:
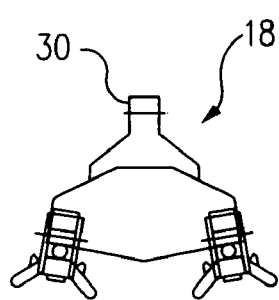
Figure 3F:
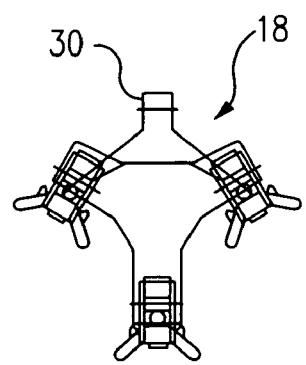

Since such aircraft 1 are typically capable of carrying greater loads than can fit into the bays, it is conventional to mount additional stores items 50, e.g., weapons, fuel tanks, cameras, sensors, equipment pods and the like on the external, lower surface of the fuselage 2 and/or wings 3 by means of cantilevered pylons which, in some aircraft, are distributed longitudinally along two lines on either side of the fuselage, outboard of the bays 5 and inboard of the engine nacelles 4. In the B-1B aircraft, all of the pylon mounting stations have common, or standard, mounting dimensions and electrical interface configuration. Thus, as illustrated in FIGS. 1 and 2, the aircraft exterior contour, or moldline, at the left side pylon stations is a mirror image of the aircraft contour at the right side pylon stations. However, a common conventional pylon configuration that can be used at all stations on both sides of the aircraft would not produce an optimal weapons loadout, due to the wide variety of clearance constraints imposed by the various baydoor 6 opening configurations and/or engine nacelle 4 locations.

Thus, depending on the pylon longitudinal location and the types of stores 50 carried both internally and externally, the pylon may need to be oriented generally vertically, as illustrated in FIG. 1, or alternatively, be canted outboard to some extent, as illustrated in FIG. 2, to provide for an optimal external stores loadout. Additionally, uploading internal stores into the weapons bays 5 usually requires fully opened bay doors 6, as illustrated in FIG. 2, which would not allow the presence of conventional pylons adjacent to the doors unless the pylons were canted outboard.

It has been discovered that the problem of designing a common, or "universal" pylon useable on each side of aircraft 1 such as the B-1B, i.e., one which is capable of mounting at any station on either side of the aircraft, and which is also compatible with various internal/external stores 50 and with the bay doors 6 and engine nacelle 4 clearance constraints unique to each longitudinal pylon station, can be solved with a pivotable pylon 10 in accordance with the present invention. The novel pivotable pylon can be quickly ground-reconfigured on the aircraft by the weapons loaders to one of a plurality of different angular carriage orientations, as illustrated in FIG. 2, to provide the necessary clearance between the externally carried stores items 50 and the adjacent bay doors 6 and/or engine nacelles 4. As illustrated in the figure, the pivoting axis of the pylon is parallel to the direction of flight of the aircraft, typically its longitudinal axis. During flight, the pylon remains fixed in the angular pivot position at which it was configured on the ground.

Figure 4:
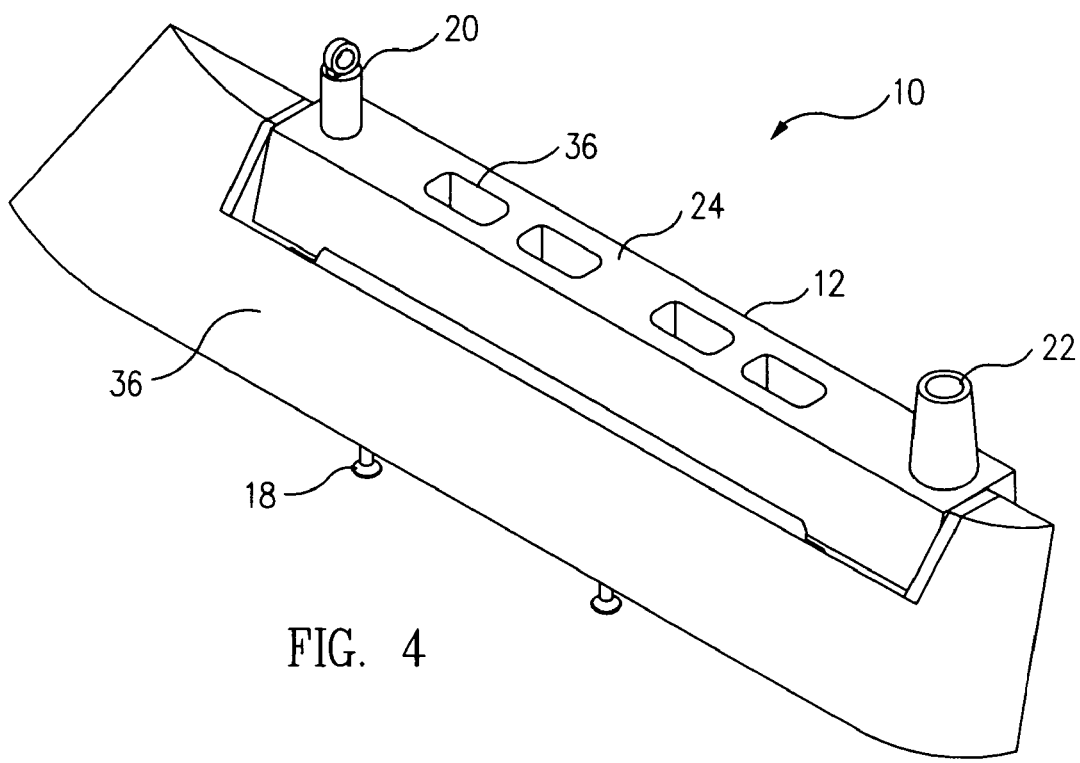
FIG. 4 is a top and side perspective view of an exemplary embodiment of a pivotable pylon for external carriage aircraft stores in accordance with the present invention.

A top and side perspective view of an exemplary embodiment of a pivotable pylon 10 in accordance with the present invention is illustrated in FIG. 4, in which a removable aerodynamic fairing 36 is shown disposed on the pylon. The fairing extends generally between the external surface of the aircraft to which the pylon is mounted and an external surface of the stores item(s) carried by the pylon to limit the parasitic aerodynamic drag of the pylon during high-speed flight of the aircraft.

Figure 5:
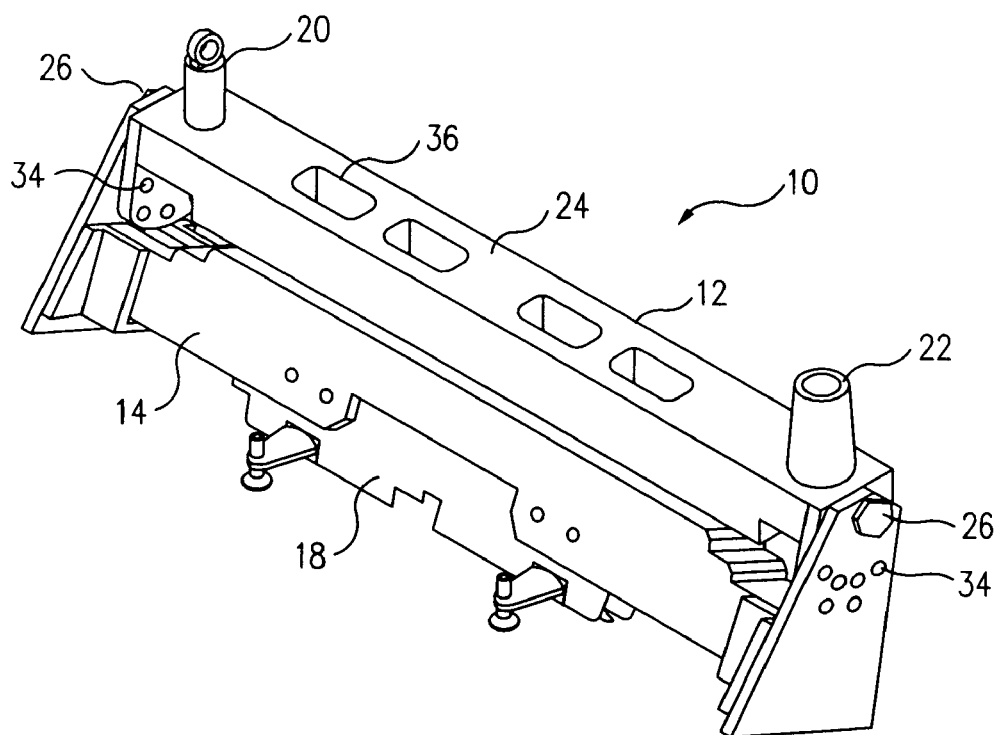
FIG. 5 is a top and side perspective view of the exemplary pivotable pylon, with an aerodynamic fairing thereof removed to reveal the underlying structures.

In the perspective view of FIG. 5, the pylon 10 assembly is shown with the fairing 36 removed for purposes of description. As illustrated in the figure, the pylon assembly comprises an elongated strongback 12, an elongated pivoting structure 14 pivotally coupled to the strongback for parallel pivotal movement relative thereto, a locking mechanism 32 and 34 for locking the pivoting structure in a selected one of a plurality of angular pivot positions relative to the strongback, and at least one stores rack 18 coupled to the pivoting structure for receiving and coupling at least one stores item to the pivoting structure.

Figure 6:
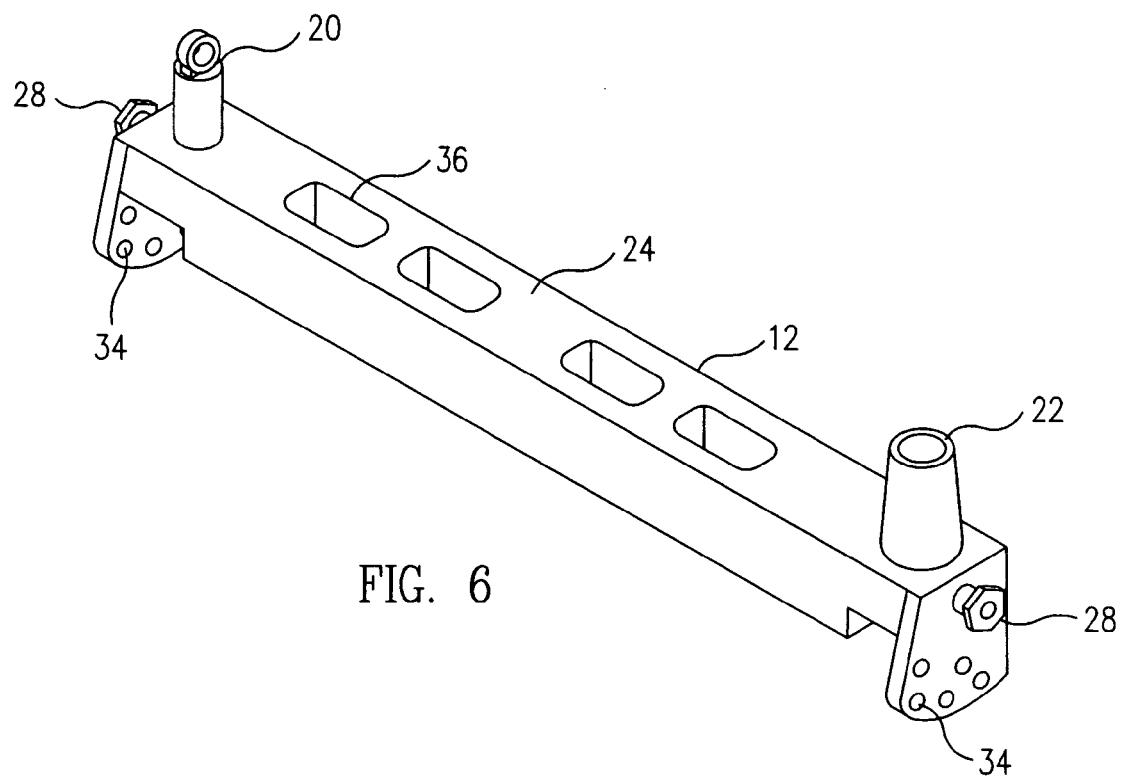
FIG. 6 is a top and side perspective view of a strongback of the exemplary pylon; and, FIG. 7 is a top and side perspective view of a pivoting structure of the exemplary pylon.

The strongback 12 of the pylon 10 is illustrated in the detailed perspective view thereof of FIG. 6. The strongback includes one or more fasteners 20 and 22 disposed on a first surface 24 thereof for coupling the strongback to the hardpoints of an aircraft such that the first surface is held generally flush against an external surface of the aircraft, and the strongback is disposed generally parallel to the aircraft's longitudinal axis. In one advantageous embodiment, the fasteners 20 and 22 of the strongback comprise a conventional pylon suspension fitting 20 and a conventional pylon suspension post 22 that are spaced apart longitudinally by a standard distance that corresponds to the common pylon-mounting hardpoint spacings of the aircraft, and which are interchangeable with each other on the strongback. In the particular embodiment illustrated, the strongback is asymmetrical with respect to a sagital plane extending through it longitudinally, so that it can accommodate the bilaterally symmetrical aircraft shape, i.e., mate with the aircraft contour on either side of the aircraft. Then, by simply interchanging the fasteners 20 and 22 on the pylon, and reversing the front-to-rear orientation of the strongback 12 on the aircraft, the pylon 10 can be mounted on either side of the aircraft, and in any one of the plurality of longitudinal pylon mounting stations thereof.

Figure 7:
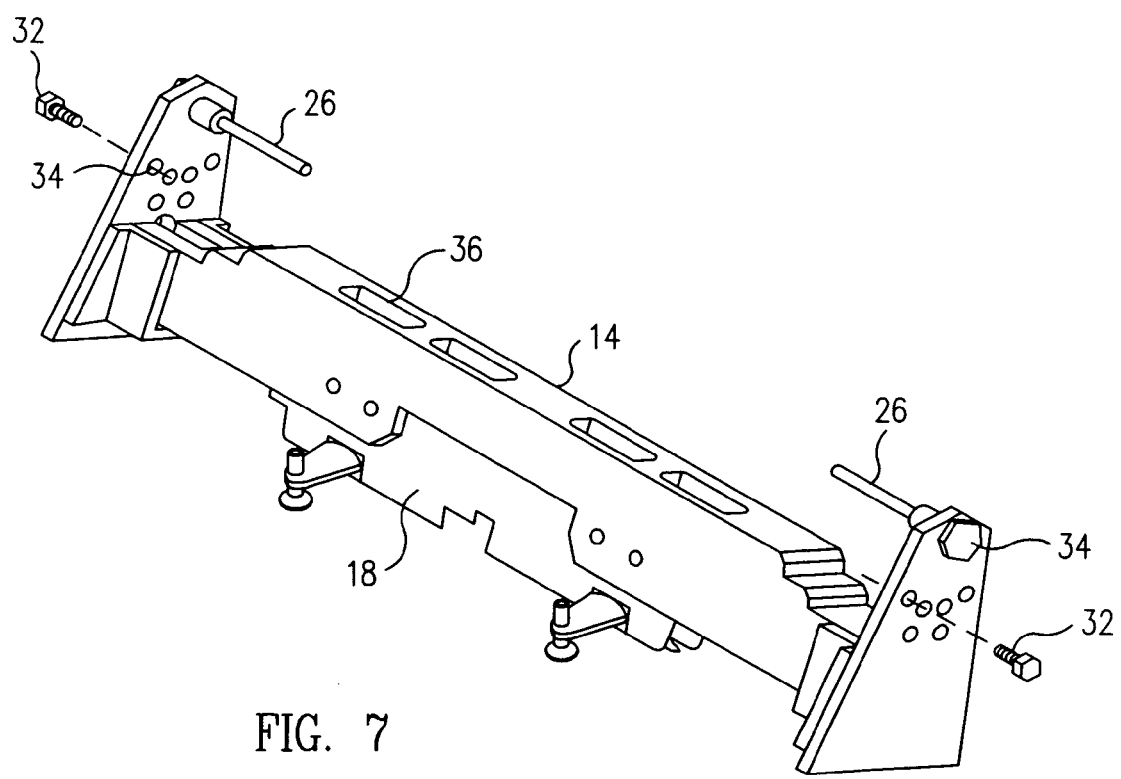

As illustrated in the detail perspective view of FIG. 7, the pivotable pylon 10 further comprises an elongated pivoting structure 14 that is pivotally coupled to the strongback 12 for parallel pivotal movement relative to the strongback, i.e., parallel to the longitudinal axis of the aircraft. In one possible embodiment, the pivoting structure may be pivotally coupled to the strongback by a pair of longitudinally oriented pivot shafts, or pins 26, each disposed at an opposite end of the pivoting structure and pivotally engaged in a corresponding bearing 28 (see FIG. 6) at a corresponding respective end of the strongback, as illustrated. However, as those of skill in the art will appreciate, other functionally equivalent mechanisms for pivotally coupling the pivoting structure to the strongback are available and may be used in place of that described and illustrated herein.

For ejectably carrying at least one aircraft stores item 50 (see FIGS. 1 and 2), such as a weapon or a pod, the pylon 10 further includes at least one stores ejector rack 18, such as a multiple ejector rack ("MER"), coupled to the pivoting structure for receiving and coupling the stores item(s) to the pivoting structure 14. A wide variety of stores ejector rack and MER embodiments that can be coupled to the pivoting structure are illustrated in the front elevation views of FIGS. 3A–3F. The stores ejector rack(s) may include conventional suspension fasteners 30 that are adapted to engage in corresponding sockets within the pivoting structure 14, and be held therein with, e.g., shear bolts. Additionally, the ejector rack(s) 18 may be of the type that is capable of releasing, or ejecting, the stores item from the pylon during flight. Unlike the strongback 12, both the stores rack(s) and the pivoting structure may be symmetrical with respect to a sagital plane extending therethrough, as illustrated in FIGS. 3A–3F and 7, respectively.

Advantageously, the pylon 10 includes a simple indexing and locking mechanism 32 and 34 for locking the pivoting structure 14 in a selected one of a plurality of angular pivot positions relative to the strongback 12, and hence, the aircraft 1 (FIGS. 1 and 2), thereby enabling the angular pivot position of the stores items 50 to be ground-adjusted relative to the exterior surface of the aircraft, and thereby provide the necessary clearance between the stores items and adjacent aircraft structures at each of the pylon mounting stations, such as the doors 6 of a weapons bay 5, and/or the engine nacelles 4, as illustrated in FIG. 2. In the particular exemplary embodiment illustrated, the locking mechanism comprises a pair of locking fasteners 32, e.g., bolts, each of which is disposed at an opposite end of the strongback and the pivoting structure, and which extends through a corresponding one of plurality of longitudinal locking apertures 34 arrayed in respective opposite ends of the strongback and pivoting structure, as illustrated in FIGS. 6 and 7. Alternatively, the locking mechanism can comprise complementary pairs of arcuate segments of longitudinally engaging gear teeth (not illustrated) disposed at the respective opposite ends of the strongback and pivoting mechanism. As those of skill in the art will appreciate, many other functionally equivalent pivoting structure indexing and locking mechanisms 32 and 34 are possible and can be used in place of that described and illustrated herein.

Of further advantage, each of the strongback 12, the pivoting structure 14 and the ejector rack 18 may be provided with internal intercommunicating channels 36 for containing electrical cables and fluid conduits (not visible) for transmitting signals, power and, e.g., fuel, between the aircraft 1 and the ejector rack and/or the stores 50 coupled thereto internally of the pylon.

By now, those of skill in this art will appreciate that many modifications, substitutions and variations can be made in and to the materials, components, configurations and methods of implementation of the pivotable pylon 10 of the present invention without departing from its spirit and scope. Accordingly, the scope of the present invention should not be limited to the particular embodiments illustrated and described herein, as they are merely exemplary in nature, but instead, should be fully commensurate with that of the claims appended hereafter and their functional equivalents.

What is claimed is:

1. A pivotable pylon, comprising:
   an elongated strongback having at least one fastener disposed on a first surface thereof for coupling the strongback to an aircraft such that the first surface is held generally flush with an external surface of the aircraft and the strongback is disposed generally parallel to a longitudinal axis thereof;
   an elongated pivoting structure pivotally coupled to the strongback for parallel pivotal movement of the structure relative to the strongback;
   means for locking the pivoting structure in a selected one of a plurality of angular pivot positions relative to the strongback; and,
   at least one stores ejector rack coupled to the pivoting structure for receiving and coupling at least one stores item to the pivoting structure.

2. The pivotable pylon of claim 1, further comprising an aerodynamic fairing disposed on the pylon and extending generally between the external surface of the aircraft and an external surface of the at least one stores item.

3. The pivotable pylon of claim 1, wherein the strongback is asymmetrical with respect to a sagittal plane extending therethrough.

4. The pivotable pylon of claim 1, wherein at least one of the pivoting structure and the at least one stores ejector rack is symmetrical with respect to a sagittal plane extending therethrough.

5. The pivotable pylon of claim 1, wherein the at least one fastener comprises a suspension fitting and a suspension post.

6. The pivotable pylon of claim 5, wherein the suspension fitting and the suspension post are interchangeable with each other on the strongback.

7. The pivotable pylon of claim 1, wherein the pivoting structure is pivotally coupled to the strongback by a pair of pivot pins, each disposed at an opposite end of the pivoting structure and longitudinally engaging a corresponding bearing at a corresponding respective end of the strongback.

8. The pivotable pylon of claim 1, wherein the strongback and pivoting structure locking means comprises a pair of locking fasteners, each disposed at an opposite end of the strongback and the pivoting structure and extending through a corresponding pair of longitudinal locking apertures contained in respective ones of the strongback and the pivoting structure.

9. The pivotable pylon of claim 1, wherein the at least one stores ejector rack comprises at least one fastener disposed on a surface thereof and adapted to engage a corresponding socket in the pivoting structure.

10. The pivotable pylon of claim 1, wherein the at least one stores item is ejectable from the pylon during flight of the aircraft.

11. An aircraft having the pivotable pylon of claim 1 coupled on an external surface thereof.

12. A method for carrying stores on an aircraft, the method comprising:
   providing a pivotable pylon in accordance with claim 1;
   coupling the pylon to an external surface of the aircraft; and,
   coupling at least one stores item to the pivoting structure of the pylon.

* * * * *